No. 645,760. Patented Mar. 20, 1900.
N. B. SPENCER.
COMBINED REAMER AND DRILL.
(Application filed Nov. 20, 1899.)
(No Model.)

Witnesses
Oliver B. Kaiser
Edw. S. Alexander

Inventor
Napoleon B. Spencer
by Wood Boyd & Wood
Attorneys

UNITED STATES PATENT OFFICE.

NAPOLEON B. SPENCER, OF CINCINNATI, OHIO.

COMBINED REAMER AND DRILL.

SPECIFICATION forming part of Letters Patent No. 645,760, dated March 20, 1900.

Application filed November 20, 1899. Serial No. 737,610. (No model.)

*To all whom it may concern:*

Be it known that I, NAPOLEON B. SPENCER, a citizen of the United States, residing at Cincinnati, in the county of Hamilton and State of Ohio, have invented certain new and useful Improvements in a Combined Reamer and Drill, of which the following is a specification.

One of the objects of my invention is to provide an improved reamer carrying several cutters with means for simultaneously and uniformly adjusting the same.

Another object of my invention is to provide a combined reamer and cutting-tool having the mechanism for simultaneously adjusting the cutters.

The features of my invention will be more fully set forth in the description of the accompanying drawings, forming a part of this specification, in which—

Figure 1:
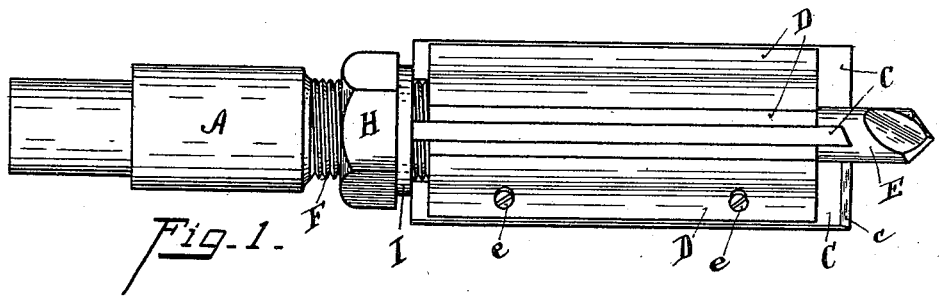
Figure 2:
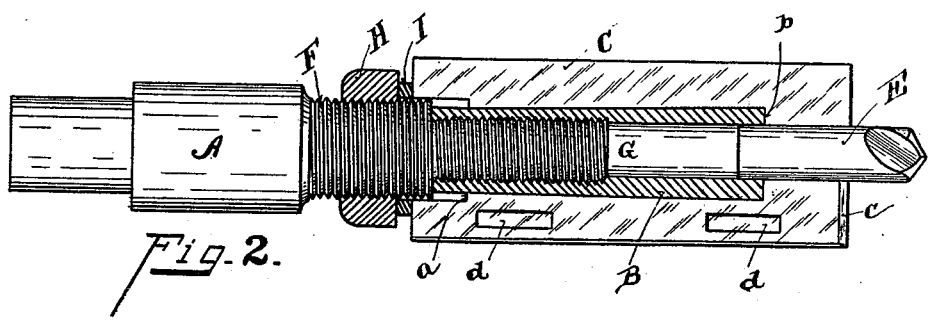
Figure 3:
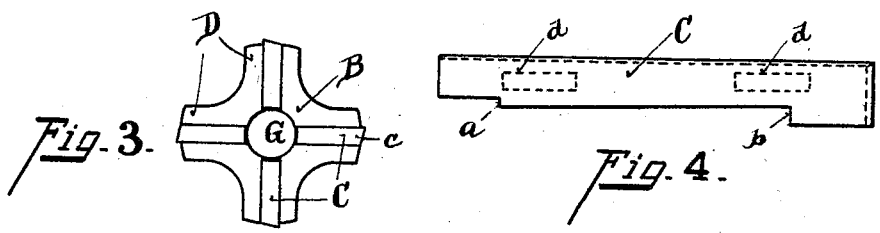
Figure 4:
Figure 5:

Figure 1 is an elevation of my invention in position for use. Fig. 2 is a sectional elevation of Fig. 1. Fig. 3 is an end view with the bit removed. Fig. 4 is a plan view of the combined reaming and boring cutter-blade. Fig. 5 is a plan view of the reaming cutter-blade simply.

A represents the main spindle. It is provided with two different-sized threads. The smaller threaded end fits into a bore G of the cutter-head B. This cutter-head is composed of a series of radial wings which are slotted or gained longitudinally to receive the cutters C.

D represents the slotted radial wings. I have shown four. There may be any number of such wings as desired. The base of the slot is tapering toward the spindle, as shown in Fig. 2. The cutter-blades are likewise tapered and rest upon the base of this inclined groove.

E represents a center-bit which is of ordinary construction and has a frictional engagement with the bore of the cutter-head, so as to hold it in position for drilling. This frictional engagement is usually made by slightly tapering the shank of the bit.

The cutters C are provided with notches *a b*, thus forming offsets. The offset *a* allows the cutter to project above the adjusting-threads F. The forward inward projection of the cutter C fits over the end of the cutter-head and is supported thereon in close proximity to the center-bit, as shown in Fig. 2. The end of the cutter is beveled, as at *c*, to form a drill.

*d d* represent longitudinal recesses formed in the face of the cutters to receive the end of the set-screws *e*, which pass through the sides of the wings to hold the cutters from radial movement when they are adjusted forward. In order to adjust these cutters longitudinally, I provide the following means.

H represents a nut tapping on the threads F of the spindle.

I represents a washer loosely resting on said threads and abutting the ends of the cutter and the face of the nut H. As the nut H is turned forward it moves the cutters forward on their incline, which sets their periphery radially outward in proportion to the distance moved. The recesses *d* allow the cutters to slip on the points of the set-screw *e*.

When the tool is used for a reamer simply, the cutter-blades C' are employed and are accordingly made to the plan shown in Fig. 5.

It will thus be seen that my cutters are very firmly connected to the drill-spindle and are securely held in position for work and that the several cutters may be simultaneously adjusted longitudinally without slacking the set-screws.

By the construction herein shown I provide a combined reamer and drilling-tool having the ready means of adjustment heretofore described.

I do not wish to limit myself to the thread engagement of the spindle with the cutter-head, as any other means of making a firm connection with these parts may be employed; but I consider the thread form the best.

Having described my invention, I claim—

1. In a combined reamer and drill the combination of a cutter-head, a spindle attached thereto, a series of radial wings, a slot in each wing having a tapered seat, a cutter-blade in each slot, a recess in the side face of each blade parallel with the tapered seat, a holding device supported laterally by each wing engaging in said blade-recess, and means mounted on the spindle for adjusting the position of the cutter-blades, substantially as specified.

2. In combination with the double-threaded spindle A, provided with the adjusting-threads and a second series of threads with the cutter-head B having the radial slotted wings and a bore having a threaded engagement with the end of the spindle, a center-bit secured in said bore and the cutters C located in said wings and having an inner projection adjacent to the cutter-bit and the adjusting-nut engaging with said spindle and cutters, substantially as described.

3. In combination with the cutter-head of a combined reamer and drill, having a series of slotted radial wings, taper-seats at the base of said slots, a series of cutters provided with an inward projection forward of the bore of the cutter-head and a center-bit supported in the bore of said cutter-head adjacent to the inner face of the cutter, substantially as herein specified.

4. In a combined reamer and drill the combination of a cutter-head having a screw-threaded central bore, a series of radial wings on the cutter-head each having a radial slot, tapered seats in said slots, a cutter-blade in each slot, a spindle having a reduced screw-threaded end engaging the said bore, the adjacent larger spindle portion being also screw-threaded and having an adjusting-nut thereon, the end of the said larger spindle portion forming a shoulder abutting the inner end of the cutter-head, a recess in the face of each cutter-blade parallel to the taper of the seat, and means projected laterally from each radial wing engaging into said recesses, substantially as and for the purposes specified.

5. In a combined reamer and drill, the combination of a cutter-head having a spindle, a series of radial slots in said cutter-head, each having a tapered seat, a cutter-blade in each slot engaging the seat, a recess in the side of each blade parallel with the tapered seat, a screw passing through the cutter-head into the side of said slot and engaging the recess in the face of the blade seated in said slot, and means mounted on the spindle for adjusting the position of the cutter-blades, substantially as described.

In testimony whereof I have hereunto set my hand.

NAPOLEON B. SPENCER.

Witnesses:
OLIVER B. KAISER,
EDWD. T. ALEXANDER.